United States Patent
Ollila

(10) Patent No.: US 12,183,021 B2
(45) Date of Patent: Dec. 31, 2024

(54) HIGH DYNAMIC RANGE VIEWPOINT SYNTHESIS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 349 days.

(21) Appl. No.: 17/886,788

(22) Filed: Aug. 12, 2022

(65) Prior Publication Data
US 2024/0054667 A1    Feb. 15, 2024

(51) Int. Cl.
*G06T 7/55*    (2017.01)
*G06T 5/50*    (2006.01)
*G06V 10/24*   (2022.01)

(52) U.S. Cl.
CPC ............. *G06T 7/55* (2017.01); *G06T 5/50* (2013.01); *G06T 2207/10028* (2013.01); *G06T 2207/20221* (2013.01); *G06V 10/243* (2022.01)

(58) Field of Classification Search
None
See application file for complete search history.

(56) References Cited

U.S. PATENT DOCUMENTS

| | | | |
|---|---|---|---|
| 9,704,250 B1 * | 7/2017 | Shah | H04N 23/676 |
| 2015/0373318 A1 * | 12/2015 | Li | G06T 7/593 |
| | | | 348/50 |
| 2022/0329880 A1 * | 10/2022 | Zhang | H04N 21/472 |

OTHER PUBLICATIONS

Mildenhall et al., "Local Light Field Fusion: Practical View Synthesis with Prescriptive Sampling Guidelines," ACM Transactions on Graphics, vol. 38, Issue 4, Article 29, pp. 1-14, Aug. 2019, US.
Li et al., "Mine: Towards Continuous Depth MPI with NeRF for Novel View Synthesis," IEEE/CVF International Conference on Computer Vision (ICCV), pp. 12558-12568, Mar. 2021, US.
Tucker et al., "Single-View View Synthesis with Multiplane Images," IEEE/CVF Conference on Computer Vision and Pattern Recognition (CVPR), pp. 548-557, 2020, US.
Zhou et al., Stereo Magnification: Learning View Synthesis using Multiplane Images, ACM Trans. Graph., vol. 37, No. 4, Article 65, Aug. 2018, US.

* cited by examiner

*Primary Examiner* — Haris Sabah
(74) *Attorney, Agent, or Firm* — Ziegler IP Law Group LLC.

(57) ABSTRACT

An imaging system including processor(s) and data repository. Processor(s) are configured to: receive images of region of real-world environment that are captured by cameras using at least one of: different exposure times, different sensitivities, different apertures; receive depth maps of region that are generated by depth-mapping means; identify different portions of each image that represent objects located at different optical depths; create set of depth planes corresponding to each image; warp depth planes of each set to match perspective of new viewpoint corresponding to which output image is to be generated; fuse sets of warped depth planes corresponding to two or more images to form output set of warped depth planes; and generate output image from output set of warped depth planes.

18 Claims, 5 Drawing Sheets

HIGH DYNAMIC RANGE VIEWPOINT SYNTHESIS

TECHNICAL FIELD

The present disclosure relates to imaging systems incorporating high dynamic range viewpoint synthesis. The present disclosure relates to methods incorporating high dynamic range viewpoint synthesis.

BACKGROUND

Nowadays, with an increase in the number of images being captured every day, there is an increased demand for image processing. For example, such a demand may be quite high and critical in case of evolving technologies such as extended-reality (XR). Several advancements are being made to develop techniques for image processing that facilitate generation of images having high dynamic range (HDR) characteristics.

However, existing equipment and techniques for image processing have several limitations associated therewith. Firstly, the existing equipment and techniques are not well-suited for generating HDR images. Particularly, some existing equipment and techniques fail to employ novel view synthesis for generating the HDR images from a novel viewpoint using already captured (real-world) images. In an example, some existing techniques for image processing are capable of generating images only from a stationary novel viewpoint by employing the novel view synthesis. Secondly, the existing techniques that are employed for the novel view synthesis are computationally intensive and time consuming as an amount of image data that is to be processed is considerably high. For example, the amount of image data could be of several multiples of megapixels, especially when the images to be generated are to emulate image viewing quality and characteristics of the human visual system. Thus, in such cases, the generated images are suboptimal (i.e., low quality and unrealistic), and are often generated with considerable latency/delay. This may, for example, lead to a poor, non-immersive viewing experience for a user.

Therefore, in light of the foregoing discussion, there exists a need to overcome the aforementioned drawbacks associated with existing equipment and techniques for image processing.

SUMMARY

The present disclosure seeks to provide an imaging system incorporating high dynamic range viewpoint synthesis. The present disclosure also seeks to provide a method incorporating high dynamic range viewpoint synthesis. An aim of the present disclosure is to provide a solution that overcomes at least partially the problems encountered in prior art.

In a first aspect, an embodiment of the present disclosure provides an imaging system comprising at least one processor and a data repository communicably coupled to the at least one processor, wherein the at least one processor is configured to:
  receive a plurality of images of a given region of a real-world environment that are captured by a plurality of cameras, wherein at least two images from amongst the plurality of images are captured using at least one of: different exposure times, different sensitivities, different apertures;
  receive corresponding depth maps of the given region of the real-world environment with respect to different viewpoints of the plurality of cameras, wherein the corresponding depth maps are generated by depth-mapping means corresponding to each of the plurality of cameras;
  identify different portions of each image that represent objects located at different optical depths with respect to a viewpoint of a given camera that captured said image;
  create a set of depth planes corresponding to each image, based on the different optical depths of the objects and relative positions of the different portions of said image representing the objects, wherein a given depth plane is representative of objects or parts of the objects that are located at a same optical depth or within a predefined depth from the same optical depth;
  warp depth planes of each set to match a perspective of a new viewpoint corresponding to which an output image is to be generated;
  fuse sets of warped depth planes corresponding to two or more images from amongst the plurality of images to form an output set of warped depth planes; and
  generate the output image from the output set of warped depth planes.

In a second aspect, an embodiment of the present disclosure provides a computer-implemented method comprising:
  receiving a plurality of images of a given region of a real-world environment that are captured by a plurality of cameras, wherein at least two images from amongst the plurality of images are captured using at least one of: different exposure times, different sensitivities, different apertures;
  receiving corresponding depth maps of the given region of the real-world environment with respect to different viewpoints of the plurality of cameras, wherein the corresponding depth maps are generated by depth-mapping means corresponding to each of the plurality of cameras;
  identifying different portions of each image that represent objects located at different optical depths with respect to a viewpoint of a given camera that captured said image;
  creating a set of depth planes corresponding to each image, based on the different optical depths of the objects and relative positions of the different portions of said image representing the objects, wherein a given depth plane is representative of objects or parts of the objects that are located at a same optical depth or within a predefined depth from the same optical depth;
  warping depth planes of each set for matching a perspective of a new viewpoint corresponding to which an output image is to be generated;
  fusing sets of warped depth planes corresponding to two or more images from amongst the plurality of images for forming an output set of warped depth planes; and
  generating the output image from the output set of warped depth planes.

Embodiments of the present disclosure substantially eliminate or at least partially address the aforementioned problems in the prior art, and facilitate a simple, fast and accurate viewpoint synthesis that generates output images having high dynamic range, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
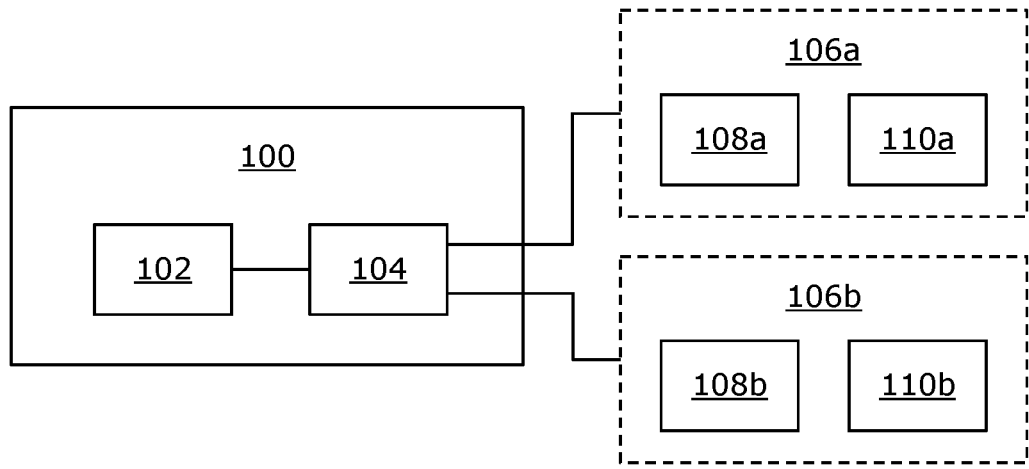
FIG. 1 illustrates a block diagram of an architecture of an imaging system incorporating high dynamic range viewpoint synthesis, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising at least one processor and a data repository communicably coupled to the at least one processor, wherein the at least one processor is configured to:
receive a plurality of images of a given region of a real-world environment that are captured by a plurality of cameras, wherein at least two images from amongst the plurality of images are captured using at least one of: different exposure times, different sensitivities, different apertures;
receive corresponding depth maps of the given region of the real-world environment with respect to different viewpoints of the plurality of cameras, wherein the corresponding depth maps are generated by depth-mapping means corresponding to each of the plurality of cameras;
identify different portions of each image that represent objects located at different optical depths with respect to a viewpoint of a given camera that captured said image;
create a set of depth planes corresponding to each image, based on the different optical depths of the objects and relative positions of the different portions of said image representing the objects, wherein a given depth plane is representative of objects or parts of the objects that are located at a same optical depth or within a predefined depth from the same optical depth;
warp depth planes of each set to match a perspective of a new viewpoint corresponding to which an output image is to be generated;
fuse sets of warped depth planes corresponding to two or more images from amongst the plurality of images to form an output set of warped depth planes; and
generate the output image from the output set of warped depth planes.

In a second aspect, an embodiment of the present disclosure provides a computer-implemented method comprising:
receiving a plurality of images of a given region of a real-world environment that are captured by a plurality of cameras, wherein at least two images from amongst the plurality of images are captured using at least one of: different exposure times, different sensitivities, different apertures;
receiving corresponding depth maps of the given region of the real-world environment with respect to different viewpoints of the plurality of cameras, wherein the corresponding depth maps are generated by depth-mapping means corresponding to each of the plurality of cameras;
identifying different portions of each image that represent objects located at different optical depths with respect to a viewpoint of a given camera that captured said image;
creating a set of depth planes corresponding to each image, based on the different optical depths of the objects and relative positions of the different portions of said image representing the objects, wherein a given depth plane is representative of objects or parts of the objects that are located at a same optical depth or within a predefined depth from the same optical depth;
warping depth planes of each set for matching a perspective of a new viewpoint corresponding to which an output image is to be generated;
fusing sets of warped depth planes corresponding to two or more images from amongst the plurality of images for forming an output set of warped depth planes; and
generating the output image from the output set of warped depth planes.

The present disclosure provides the aforementioned imaging system and the aforementioned method, which facilitate a simple, fast and accurate viewpoint synthesis that generates output images having high dynamic range. The imaging system and method are susceptible to be implemented for generating output images from a perspective of both a stationary novel viewpoint as well as a moving novel viewpoint. Since the sets of warped depth planes corresponding to only two or more images are required to be fused for forming the output set of warped depth planes, generation of the output image is neither computationally intensive nor time consuming. The output images so generated are of high quality and are realistic, and are generated in real time or near-real time (without any latency/delay). This potentially leads to a realistic, immersive viewing experience for a user, when these output images are displayed to the user. The method is simple, robust, fast, reliable and can be implemented with ease, without requiring any changes in camera hardware.

Throughout the present disclosure, the term "processor" refers to hardware, software, firmware or a combination of these. The at least one processor controls an overall operation of the imaging system. In some implementations, the at least one processor is implemented as a remote server. In such implementations, the remote server receives the plurality of images and the corresponding depth maps from the plurality of cameras and the depth-mapping means, respectively (or a device comprising the plurality of cameras and the depth-mapping means), or from the data repository. In an example, the remote server could be a cloud server that provides a cloud computing service. Examples of the device include, but are not limited to, a head-mounted display device and a teleport device. In other implementations, the at least one processor is implemented as a processor of the device comprising the plurality of cameras and the depth-mapping means or a processor of a computing device communicably coupled to the device. Examples of the computing device include, but are not limited to, a laptop, a desktop computer, a personal digital assistant, a workstation, a console.

Throughout the present disclosure, the term "data repository" refers to hardware, software, firmware, or a combination of these for storing at least one of: a given image, a depth map corresponding to the given image, a set of depth planes corresponding to the given image, the output set of warped depth planes. The data repository may be implemented as a memory of the at least one processor, a cloud-based database, or similar. The data repository is communicably coupled to the at least one processor wirelessly and/or in a wired manner.

Throughout the present disclosure, the term "camera" refers to an equipment that is operable to detect and process light signals received from the given region of the real-world environment, so as to capture image(s) of the given region of the real-world environment. In some implementations, the imaging system comprises the plurality of cameras. Throughout the present disclosure, the term "viewpoint" encompasses both a viewing position at which a given camera is positioned in the real-world environment as well as a viewing direction in which the given camera is capturing image(s).

Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera.

It will be appreciated that the plurality of cameras could be controlled to adjust at least one of: exposure times, sensitivities, apertures, when capturing the images. The technical benefit of employing the at least two images captured using at least one of: different exposure times, different sensitivities, different apertures is that it facilitates generation of an output image having a high dynamic range (HDR).

Throughout the present disclosure, the term "exposure time" refers to a time span for which a photo-sensitive surface of an image sensor of a given camera is exposed to light, so as to capture a given image of the given region of the real-world environment. Furthermore, the term "sensitivity" refers to a measure of how strongly the photo-sensitive surface of the image sensor of the given camera responds when exposed to light, so as to capture a given image of the given region of the real-world environment. Greater the sensitivity of the given camera, lesser is an amount of light required to capture the given image, and vice versa. Typically, the sensitivity of the given camera is expressed in terms of ISO levels, for example, such as lying in a range of ISO 100 to ISO 6400. It will be appreciated different sensitivities could be obtained by the given camera by changing (namely, altering) analog gain and/or digital gain of the given camera. Techniques and algorithms for changing the analog gain and/or the digital gain of the given camera (in image signal processing) are well-known in the art. Moreover, the term "aperture" refers to a size of an opening present in the given camera through which the light emanating from the real-world environment enters the given camera and reaches the photo-sensitive surface of the image sensor of the given camera. The aperture of the given camera is adjusted to control an amount of light that is allowed to enter in the given camera when capturing a given image of the given region of the real-world environment. Typically, the aperture of the given camera is expressed in an f-number format. Lesser the f-number, greater is the aperture of the given camera and greater is the amount of light reaching the photo-sensitive surface of the image sensor, and vice versa. The f-number could be, for example, such as f/1.4, f/8, f/11, f/16, f/32, and the like.

Optionally, the given camera is arranged at a fixed location within the real-world environment. Optionally, in such a case, the given camera is stationary in the real-world environment. In this regard, a viewpoint of the given camera (i.e., a position and an orientation of the given camera) does not change with time. Alternatively, optionally, the given camera is movable in the real-world environment. In this regard, the viewpoint of the given camera changes, i.e., at least an orientation of the given camera changes with respect to time. It will be appreciated that at least the orientation of the given camera may be adjusted (namely, changed) by using a motorised actuator. In such a case, information pertaining to the orientation of the given camera could be accurately known (to the at least one processor). The actuator may be driven by an actuation signal, for example, such as a piezoelectric force, an electromagnetic force, a mechanical torque, an electric current, or similar. Different viewpoints of cameras serve as different known viewpoints for capturing the image(s).

Optionally, the imaging system further comprises tracking means for tracking a viewpoints of the given camera. It will be appreciated that the tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Optionally, the at least one processor is configured to process tracking data, collected by the tracking means, to track the viewpoint of the given camera. The tracking means may employ an outside-in tracking technique, an inside-out tracking technique, or a combination of both the aforesaid techniques, for collecting the tracking data. The tracking data may be in form of images, IMU/TIMU values, motion sensor data values, magnetic field strength values, or similar.

Optionally, the given camera and/or the depth-mapping means is/are arranged on a given device present in the real-world environment. Such a device could be arranged at a fixed location within the real-world environment. Optionally, in such a case, the device is stationary in the real-world environment. Additionally or alternatively, the device could be a wearable device being worn by a user present in the real-world environment. In such a case, the location of such a device changes with a change in a location of its user. Likewise, the device could be arranged on, for example, a drone, a robot, or similar. As an example, the device could be arranged on a support structure that is capable of a three-dimensional (3D) rotation (and additionally, capable of a translation motion). The support structure can be moved to any required location in the real-world environment. In some implementations, a plurality of such devices may employ peer-to-peer (P2P) computing for implementing the aforementioned method of the present disclosure.

As an example, the device may be implemented as a head-mounted display (HMD) device, a teleport device, and the like. The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

Furthermore, the term "depth map" refers to a data structure comprising information pertaining to optical depths of objects or their parts present in the given region of the real-world environment. The depth map provides information pertaining to distances (namely, the optical depths) of surfaces of the objects or their parts from a given viewpoint. Optionally, the depth map is an image comprising a plurality of pixels, wherein a pixel value of each pixel indicates optical depth of its corresponding real point within the given region of the real-world environment.

Optionally, the at least one processor is configured to generate the depth map of the given region of the real-world environment by processing depth-mapping data that is collected by depth-mapping means corresponding to a given camera. In some implementations, the imaging system comprises the depth-mapping means. Optionally, the at least one processor is configured to employ at least one data processing algorithm to process the depth-mapping data for generating the depth map of the given region of the real-world environment. The depth-mapping data may be in a form of depth images, phase images, visible-light images, or similar. Correspondingly, requisite data processing algorithm(s) is/are employed to process the depth-mapping data.

According to one embodiment, the depth-mapping means comprises a specialized equipment that is employed to detect optical depths of objects or their parts present in the given region. Optionally, the depth-mapping means is implemented as a first camera and a second camera. In this regard, the first camera and the second camera are implemented as the visible-light camera or as the combination of the visible-light camera and the depth camera. Alternatively, optionally, the depth-mapping means is implemented as at least one depth camera. It will be appreciated that the depth map could also be generated using at least one of: depth from stereo, depth from focus, depth from reflectance, depth from shading, when the given camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the depth map could also generated even without using the at least one depth camera. In this regard, the depth map could be generated by using at least one of: a neural network model, a monocular depth estimation technique, a monochrome image. The monocular depth estimation technique may employ a single (monocular) RGB image for estimating depth values to generate the depth map.

According to an alternative or additional embodiment, the depth-mapping means is implemented as the at least one processor, wherein the at least one processor is configured to utilise a three-dimensional (3D) environment model of the real-world environment to generate the depth maps of the given region of the real-world environment from different perspectives of the different viewpoints of the plurality of cameras. The "three-dimensional environment model" is a data structure that comprises comprehensive information pertaining to a 3D space of the real-world environment. The 3D environment model may be in a form of a 3D polygonal mesh, a 3D point cloud, a 3D surface cloud, a 3D surflet cloud, a 3D grid, or similar.

Notably, since the depth map of the given region is already accurately known to the at least one processor, information pertaining to optical depths of the objects or their parts present in the given region can be easily ascertained by the at least one processor. Moreover, the relative positions of the different portions of the image representing the objects or their parts can be known by identifying position coordinates of these different portions of the image based on a correlation between the different portions of the image and the optical depths represented in the depth map. In this way, the at least one processor can accurately identify the different portions of each image that represent the objects located at different optical depths.

Furthermore, as mentioned earlier, the set of depth planes corresponding to each image are created, i.e., a plurality of sets of depth planes are created corresponding to respective ones of the plurality of images, by the at least one processor. In this regard, since the different optical depths of the objects are known from the depth map of the given region, and the relative positions of the different portions of said image are known to the at least one processor, the at least one processor can easily create the set of depth planes because information regarding which objects or parts of the objects are located at the same optical depth or within the predefined depth from the same optical depth is accurately known to the at least one processor. It will be appreciated that creating the set of depth planes corresponding to each image may be referred to as creating multiplane images (MPIs) corresponding to each image. Some example ways of creating the set of depth planes are described, for example, in "*Stereo Magnification: Learning View Synthesis using Multiplane Images*" by Tinghui Zhou et al., published in ACM Trans. Graph., Vol. 37, No. 4, Article 65, August 2018, and in "*Local Light Field Fusion: Practical View Synthesis with Prescriptive Sampling Guidelines*" by Ben Mildenhall et al., published in ACM Transactions on Graphics, Vol. 38, Issue 4, Article 29, pp. 1-14, August 2019, which have been incorporated herein by reference. In an example implementation, a deep learning pipeline may be used for creating the set of depth planes corresponding to each image (namely, a layered visual scene representation with multiple depth layers), and for rendering novel views (namely, output images) by blending between renderings from neighbouring sets of depth planes (namely, neighbouring MPIs), for example, by using homography warping and alpha compositing. Moreover, interpolated views could be reconstructed as a weighted combination of the renderings from the neighbouring MPIs corresponding to the given image. Blending weights could be assigned in a form of any sufficiently smooth filters for the aforesaid reconstruction. In a case where image data of the given image is sampled on a regular grid, a bilinear interpolation reconstruction filter may be employed (instead of employing an ideal sinc function interpolation filter) for a higher efficiency and due to a limited number of images. For unstructured image data, the neighbouring MPIs are reprojected to a mean scene disparity, using same blending weights.

Some other example ways of creating the set of depth planes are described, for example, in "*Single-View View Synthesis with Multiplane Images*" by Richard Tucker and Noah Snavely, published in IEEE/CVF Conference on Computer Vision and Pattern Recognition (CVPR), pp. 548-557, 2020, and in "*MINE: Towards Continuous Depth MPI with NeRF for Novel View Synthesis*" by Jiaxin Li et al., published in IEEE/CVF International Conference on Computer Vision (ICCV), pp. 12558-12568, March 2021.

It will be appreciated that a given depth plane from amongst the set of depth planes could be in a form of one of: a Red-Green-Blue-Alpha (RGB-A) image, a Red-Green-Blue (RGB) image. It will also be appreciated that the predefined depth may depend on a number of depth planes present in the set of depth planes. Greater the number of depth planes present in the set of depth planes, lesser is the predefined depth.

Notably, since a perspective of the viewpoint of the given camera and the perspective of the new viewpoint are different, there would be some offset/skewness between the images captured by the given camera and the output image that is to be generated using (the depth planes of) the aforesaid images. Thus, the at least one processor is configured to re-project (namely, warp) the depth planes of each set to match the perspective of the new viewpoint. Beneficially, this subsequently facilitates in accurately generating the output image by utilizing the warped depth planes of the aforesaid images. Optionally, when warping the depth planes of each set, the at least one processor is configured to employ at least one image reprojection algorithm. The at least one image reprojection algorithm comprises at least one space warping algorithm. Image reprojection algorithms are well-known in the art.

Once warped, the sets of warped depth planes corresponding to the two or more images are fused with each other to generate the output set of warped depth planes. It will be appreciated that in order to generate the output image having a high dynamic range, the two or more images (whose sets of warped depth planes are to be fused) must have been captured using at least one of: different exposure times, different sensitivities, different apertures. It will be appreciated that when radiometric response curves for the plurality of cameras are available to the at least one processor, the aforesaid fusion of the sets of warped depth planes is easily performed with high accuracy.

Optionally, when fusing the sets of warped depth planes, the at least one processor is configured to generate a pixel in a given warped depth plane of the output set by combining corresponding pixels of corresponding warped depth planes of the sets of the two or more images. Optionally, the aforesaid combination of corresponding pixels is performed by employing at least one of: Poisson blending, image blending using Laplacian pyramids, linear blending, non-linear blending, a maximum pixel value, a minimum pixel value, a simple block replacement, a max-min pixel value, a guided filtering, an average pixel value, a weighted average pixel value, a median pixel value. Techniques and algorithms for combining pixel are well-known in the art.

Optionally, when fusing the sets of warped depth planes, the at least one processor is configured to:
for a given warped depth plane of a given set, select a warped depth plane from amongst warped depth planes of another set whose optical depth is closest to an optical depth of the given warped depth plane; and
fuse the given warped depth plane of the given set with the warped depth plane of the another set to generate a corresponding warped depth plane of the output set.

In this regard, when the optical depth of the warped depth plane of the another set is closest to the optical depth of the given warped depth plane of the given set, it is highly likely that both the warped depth plane of another set and the given warped depth plane of the given set represent the same objects or their portions present in the given region. This allows for an accurate fusion of the warped depth planes, thereby resulting in generating the output image with high accuracy and high visual detail (i.e., with HDR characteristics).

Optionally, the at least one processor is configured to:
mark the set of depth planes corresponding to each image with information indicative of at least one of: an exposure time, a sensitivity, an aperture used to capture said image; and
select the two or more images from amongst the plurality of images, based on said information.

In this regard, when the set of depth planes corresponding to each image are marked (namely, stamped) with the aforesaid information, such information (namely, radiometric characteristics) would be accurately and readily available to the at least one processor as metainformation corresponding to said image. Thus, the at least one processor can readily ascertain, for example, which images are captured using underexposure settings, overexposure settings, and normal exposure settings. In this regard, the at least one processor can requisitely select those images whose corresponding sets of warped depth planes are to be fused to form the output set of warped depth planes. Beneficially, this enables the at least one processor to subsequently generate the output image with high visual detail (i.e., with HDR characteristics).

Alternatively, optionally, instead of marking the set of depth planes, for example, with information indicative of the exposure time, the at least one processor could normalize the pixel values of the two or more images according to different exposure settings (for example, such as an exposure setting 1, an exposure setting 2, and so on) used for capturing the two or more images. Likewise, the at least one processor could normalize the pixel values of the two or more images according to different sensitivity settings and/or different aperture settings used for capturing the two or more images.

Moreover, optionally, the at least one processor is configured to:
compute weights for pixels of the two or more images whose corresponding sets of warped depth planes are to be fused; and
fuse the sets of warped depth planes to form the output set of warped depth planes, based on the weights computed for the pixels.

In this regard, weights are assigned to the pixels of the two or more images whose corresponding sets of warped depth planes are to be fused. In other words, when fusing the sets of warped depth planes corresponding to the two or more images, different weight factors (for example, ranging from 0 to 1) could be applied to the pixels of the two or more images. Therefore, when fusing the sets of warped depth planes, the at least one processor is optionally configured to generate a pixel in a given warped depth plane of the output set, based on a weighted sum or weighted average of pixel values of corresponding pixels of warped depth planes of the sets of the two or more images. It will be appreciated that such a manner of fusing the sets of warped depth planes to form the output set of warped depth planes results in an output image that is accurate and realistic, and has high visual detail (i.e., with HDR characteristics).

In an example, when the weights range from 0 to 1, a weight of 0.8 may be assigned to a pixel of a first image, and a weight of 0.2 may be assigned to a corresponding pixel of a second image. In another example, when 10 images corresponding to 10 cameras are available, there may be a pixel in the output image which is to be generated from pixel values of 7 corresponding pixels of only 7 images out of the 10 images, wherein 3 images out of the 7 images have an exposure setting X1, and remaining 4 images have an exposure setting X2. In such a case, the at least one processor may calculate a weighted sum of the pixel values of the 7 corresponding pixels. Prior to such calculation, the weights are normalized to a range of 0 to 1.

Optionally, the weights are computed based on at least one of: brightness, sensitivity, saturation, well-exposedness, contrast, saliency, of the pixels. In this regard, the sets of warped depth planes are fused to form the output set of warped depth planes, according to the weights computed for the pixels. Computing the weights to be used for the aforesaid fusion is performed based on the aforesaid parameters, for example, by using a function of the aforesaid parameters. It will be appreciated that when the aforesaid parameters are used for computing the weights, the sets of warped depth planes are accurately and realistically fused to form the output set of warped depth planes.

In some environmental conditions, greater the brightness of a pixel of a given image, greater could be the weight assigned to the pixel of the given image, and vice versa. Moreover, greater the sensitivity of the pixel of the given image, greater is the weight assigned to the pixel of the given image, and vice versa. This is because HDR fusion is a simple linear function of exposure values, for example, such as brightness and sensitivity. Likewise, when the exposure time is high, lesser the saturation of the pixel, higher could be the weight assigned to the pixel, and vice versa. It will be appreciated that the saturation of the pixel may be computed as a standard deviation of RGB values of the pixel. Moreover, greater the well-exposedness of the pixel, greater is the weight assigned to the pixel of the given image, and vice versa. Generally, for an optimum well-exposedness of the pixel, pixel values of the pixel should not be near zero (i.e., an underexposed pixel) or one (i.e., an overexposed pixel). The well-exposedness of the pixel may be determined, for example, based on closeness of the pixel value of the pixel to an average pixel value of 122 (for 8 bit RGB value of the pixel). This could be, for example, measured using a Gaussian curve. Furthermore, greater the contrast of the pixel, higher is the weight assigned to the pixel of the given image, and vice versa. In an example, the contrast of the pixel may be calculated using Contrast Per Pixel (CPP), which is an average intensity difference between a pixel and its adjacent pixel. In order to determine contrast values of pixels of the given image, the at least one processor may apply a Laplacian filter to a grayscale version of the given image, and determine absolute values of the filter response as the contrast values. It will be appreciated that when the pixel represents a part of a salient feature in the given image, weight to be assigned to the pixel depends on how well the pixel represents the part of the salient feature. Greater the extent of representation of the part of the salient feature by the pixel, greater is the weight assigned to the pixel of the given image, and vice versa. It will be appreciated that a salient feature is visually alluring (namely, has high saliency), and the user is more likely to focus on the salient feature as compared to other features in the image. The salient feature could be, for example, an edge, a corner, or a high-frequency texture.

Alternatively or additionally, optionally, the weights are computed based on ranking of two or more cameras that captured respective ones of the two or more images. As an example, a given camera from amongst the two or more cameras that captures high-quality images is to be ranked higher than remaining camera(s) from amongst the two or more cameras in a given ranking order. Therefore, pixels of images captured by the given camera are assigned higher weights, as compared to pixels of images captured by the remaining camera(s). Greater the rank of a given camera, greater is the weight assigned to a pixel of an image captured by the given camera, and vice versa. It will be appreciated that when the weights are computed based on such a ranking, the sets of warped depth planes are accurately and realistically fused to form the output set of warped depth planes. Various factors to be considered when ranking the two or more cameras are discussed hereinbelow.

Moreover, the ranking may also be used for selecting the two or more cameras. Optionally, in this regard, the at least one processor is configured to:
rank the plurality of cameras, based on at least one of: a difference between a viewpoint of a given camera and the new viewpoint, whether there is an overlap between a focusing distance range of the given camera and a focusing distance range of a neural network that is to be employed for processing the output image, an extent of the overlap, an image resolution of the given camera, a focus plane of the given camera, noise characteristics of the given camera, colour characteristics of the given camera, how recent is an image captured by the given camera; and
select two or more cameras from amongst the plurality of cameras that captured respective ones of the two or more images whose corresponding sets of warped depth planes are to be fused, based on the ranking of the plurality of cameras.

When fields of view of the two or more cameras partially overlaps with a field of view corresponding to the new viewpoint, the plurality of cameras could be ranked based on the aforementioned factors. Greater the rank of a given camera in a given ranking order, greater is the chance of selecting the given camera from amongst the plurality of cameras, and vice versa. It will be appreciated that when the two or more cameras are selected based on such a ranking (and the aforementioned factors utilized for the ranking), the sets of warped depth planes are accurately and realistically fused to form the output set of warped depth planes. Beneficially, this enables the at least one processor to subsequently generate the output image with HDR characteristics, without a need to fuse all the sets of warped depth planes. This reduces the amount of data that needs to be processed to form the output set of warped depth planes.

In this regard, greater the difference between the viewpoint of the given camera and the new viewpoint, lower is the rank of the given camera, and vice versa. This is because when said difference is high, a perspective of the viewpoint of the given camera is considerably different from the perspective of the new viewpoint, and thus common objects or their portions present in the given region with respect to the viewpoint of the given camera and the new viewpoint would be considerably less. Additionally, optionally, when the focusing distance range of the given camera and the focusing distance range of the neural network overlap (i.e., which depth plane corresponding to the given camera matches best with the depth plane corresponding to said neural network or other selected pixels of the output image), the rank of the given camera is higher than a camera whose focusing distance range does not overlap with the focusing distance range of the neural network. In a first example, when the focusing distance range of a first camera is from 80 centimetres to 120 centimetres, and the focusing distance range of the neural network is from 80 centimetres to infinity, there would be an overlap between both the aforesaid focusing distance ranges. Additionally, optionally, greater the extent of the overlap, higher is the rank of the given camera, and vice versa. Referring to and continuing with the first example, when the focusing distance range of a second camera is from 10 centimetres to 100 centimetres, the extent of overlap is greater for the first camera as compared to the second camera. Thus, a rank of the first camera is greater than a rank of the second camera.

Moreover, greater the image resolution of the given camera, higher is the rank of the given camera, and vice versa. The image resolution of the given camera encompasses at least optics specification of the given camera and visual quality of images captured by the given camera. Additionally, optionally, when the focus plane of the given camera lies in the focusing distance range of the neural network, greater is the rank of the given camera, and vice versa. Additionally, optionally, greater the noise in the images captured by the given camera, lower is the rank of the given camera, and vice versa. This is because higher noise characteristics of the given camera degrades visual quality of images, and thus sets of warped depth planes corresponding to such images are less preferable for fusion, as compared to sets of warped depth planes corresponding to other images. Additionally, optionally, better the colour characteristics of the given camera, higher is the rank of the given camera, and vice versa. This is because better colour characteristics (for example, larger colour range) of the given camera improves visual quality of images, and thus the sets of warped depth planes corresponding to such images are more preferable for fusion, as compared to the sets of warped depth planes corresponding to the other images. Additionally, optionally, when the image captured by the given camera is more recent as compared to other camera(s), a rank of the given camera is higher as compared to the other camera(s). Such a factor is to be utilised when ranking of the plurality of cameras because the plurality of cameras may not have a perfect synchronisation when capturing the plurality of images (with different exposure settings), or the at least one processor may not have received latest images due to some network error. Optionally, in this regard, the at least one processor is configured to timestamp the plurality of images upon their receipt.

Furthermore, optionally, the at least one processor is configured to:
identify occluded pixels in each warped depth plane, based on colour values and alpha values of pixels of said warped depth plane;
remove the occluded pixels from each warped depth plane; and
fuse the sets of warped depth planes to form the output set of warped depth planes, by utilising non-occluded pixels in the warped depth planes.

After warping of a given set of depth planes corresponding to a given image, some pixels of a given depth plane might get occluded (namely, obscured) by some pixels of another depth plane in the given set. For example, after the given set of depth planes is warped, some pixels of the given depth plane representing a first object or its part that were earlier visible (from the viewpoint from which the given image was captured) may get occluded by some pixels of the another depth plane representing a second object or its part. Since the given image represents visual content of the given region, attributes associated with the given image (such as colour information, depth information, transparency information, and the like) are readily available to the at least one processor, and thus the colour values and the alpha values (namely, transparency values) of the pixels of each warped depth plane are already available to the at least one processor. Thus, the occluded pixels can be easily identified by the at least one processor.

The technical benefit of removing the occluded pixels is that the occluded pixels are not required to be processed during fusion of the sets of warped depth planes. This considerably reduces an amount of image data to be processed by the at least one processor. Beneficially, this facilitates in subsequently generating the (HDR) output image in real time or near-real time. This is because when the sets of warped depth planes are fused to form the output set of warped depth planes, only the non-occluded pixels in the warped depth planes are utilised, and the occluded pixels are not considered for the aforesaid fusion.

Optionally, the at least one processor is configured to remove the occluded pixels from each warped depth plane by employing an occlusion mask. It will be appreciated that the occluded pixels could also be removed by using neural networks, or optionally based on timestamps of the plurality of images.

Once the output set of warped depth planes are formed by the at least one processor, the output image is optionally generated by compositing the output set of warped depth planes. Such compositing may be, for example, implemented as alpha compositing. One such way of employing alpha compositing is described, for example, in "*Compositing digital images*" by Thomas Porter and Tom Duff, published in ACM SIGGRAPH Computer Graphics, Vol. 18, Issue 3, pp. pp 253-259, July 1984, which has been incorporated herein by reference.

Moreover, optionally, the at least one processor is configured to inpaint empty pixels in the output image. In this regard, the empty pixels correspond to those parts in the output image, which do not represent any visual information of the given region of the real-world environment. The technical benefit of inpainting the empty pixel is that parts of the output image which do not represent any visual information are reconstructed, i.e., an entirety of the output image is generated accurately and realistically. This improves immersiveness of user's viewing experience when the output image is presented to the user. Optionally, when inpainting the empty pixels in the output image, the at least one processor is configured to generate image data for the empty pixels by employing at least one of: an inpainting algorithm, an image conservation algorithm, an image reconstruction algorithm, a computer vision algorithm, an artificial intelligence (AI) algorithm. Such image data encompasses pixel values to be represented by the inpainted empty pixels, wherein the pixel values are indicative of at least of: colour information, depth information, transparency information, luminance information. It will be appreciated that optionally the inpainting algorithm is at least one of: a Fast Marching Method (FMM) algorithm, a Navier Stokes (NS) based inpainting algorithm, a coherence transport based inpainting algorithm, an exemplar-based inpainting algorithm, Criminisi's algorithm, a group-based sparse representation (GSR) algorithm, a compression-oriented edge-based inpainting algorithm, an annihilating filter-based low-rank Hankel matrix approach (ALOHA) algorithm, an image melding using patch-based synthesis algorithm. It will be appreciated that when the at least one processor employs the AI algorithm, various neural network models could be utilized for the aforesaid inpainting. In this regard, for the aforesaid inpainting, a given neural network model selects and uses only those warped depth planes (from amongst the output set of warped depth planes) which correspond to the empty pixels in the output image.

The present disclosure also relates to the method as described above. Various embodiments and variants disclosed above, with respect to the aforementioned first aspect, apply mutatis mutandis to the method.

Optionally, in the method, the step of fusing the sets of warped depth planes comprises:
  for a given warped depth plane of a given set, selecting a warped depth plane from amongst warped depth planes of another set whose optical depth is closest to an optical depth of the given warped depth plane; and
  fusing the given warped depth plane of the given set with the warped depth plane of the another set for generating a corresponding warped depth plane of the output set.

Optionally, the method further comprises:
  marking the set of depth planes corresponding to each image with information indicative of at least one of: an exposure time, a sensitivity, an aperture used to capture said image; and
  selecting the two or more images from amongst the plurality of images, based on said information.

Optionally, the method further comprises:
  computing weights for pixels of the two or more images whose corresponding sets of warped depth planes are to be fused; and
  fusing the sets of warped depth planes for forming the output set of warped depth planes, based on the weights computed for the pixels.

Optionally, in the method, the weights are computed based on at least one of: brightness, sensitivity, saturation, well-exposedness, contrast, saliency, of the pixels.

Optionally, in the method, the weights are computed based on ranking of two or more cameras that captured respective ones of the two or more images.

Optionally, the method further comprises:
  ranking the plurality of cameras, based on at least one of: a difference between a viewpoint of a given camera and the new viewpoint, whether there is an overlap between a focusing distance range of the given camera and a focusing distance range of a neural network that is to be employed for processing the output image, an extent of the overlap, an image resolution of the given camera, a focus plane of the given camera, noise characteristics of the given camera, colour characteristics of the given camera, how recent is an image captured by the given camera; and
  selecting two or more cameras from amongst the plurality of cameras that captured respective ones of the two or more images whose corresponding sets of warped depth planes are to be fused, based on the ranking of the plurality of cameras.

Optionally, the method further comprises:
  identifying occluded pixels in each warped depth plane, based on colour values and alpha values of pixels of said warped depth plane;
  removing the occluded pixels from each warped depth plane; and
  fusing the sets of warped depth planes for forming the output set of warped depth planes, by utilising non-occluded pixels in the warped depth planes.

Optionally, the method further comprises inpainting empty pixels in the output image.

DETAILED DESCRIPTION OF THE DRAWINGS

Referring to FIG. 1, illustrated is a block diagram of an architecture of an imaging system 100 incorporating high dynamic range viewpoint synthesis, in accordance with an embodiment of the present disclosure. The imaging system 100 comprises a data repository 102 and at least one processor (depicted as a processor 104). The data repository 102 is communicably coupled to the processor 104. Optionally, the processor 104 is communicably coupled to a plurality of devices (depicted as devices 106a and 106b) comprising respective ones of a plurality of cameras (depicted as cameras 108a and 108b, respectively) and corresponding depth-mapping means (depicted as depth-mapping means 110a and 110b, respectively).

It may be understood by a person skilled in the art that the FIG. 1 includes a simplified architecture of the imaging system 100 for sake of clarity, which should not unduly limit the scope of the claims herein. It is to be understood that the specific implementation of the imaging system 100 is provided as an example and is not to be construed as limiting it to specific numbers or types of devices, cameras and depth-mapping means. The person skilled in the art will recognize many variations, alternatives, and modifications of embodiments of the present disclosure.

Figure 2:
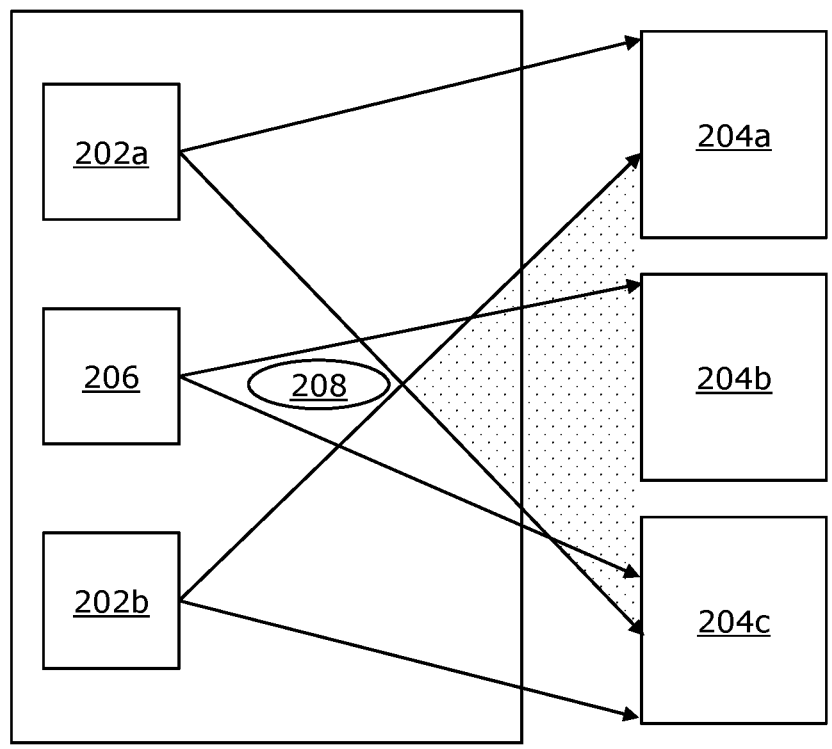
FIG. 2 illustrates how a plurality of images of a given region of a real-world environment are captured by a plurality of cameras, in accordance with an embodiment of the present disclosure.

Referring to FIG. 2, illustrated is how a plurality of images of a given region (depicted as a dotted-hatched region) of a real-world environment are captured by a plurality of cameras (depicted as cameras 202a and 202b), in accordance with an embodiment of the present disclosure. At least two images from amongst the plurality of images are captured using at least one of: different exposure times, different sensitivities, different apertures. The cameras 202a and 202b have different viewpoints, which serve as different known viewpoints. The given region represented in the plurality of images includes, for example, three objects 204a, 204b, and 204c. For example, the object 204c is represented partially in image(s) captured by the camera 202a, while the object 204a is represented partially in image(s) captured by the camera 202b. Depth-mapping means (not shown) corresponding to each of the plurality of cameras 202a and 202b generate corresponding depth maps of the given region with respect to different viewpoints of the plurality of cameras 202a and 202b. A set of depth planes is created corresponding to each image, and depth planes of each set are warped to match a perspective of a new viewpoint corresponding to which an output image is to be generated. The new viewpoint is depicted, for example, as a viewpoint of a virtual camera 206. The new viewpoint could be anywhere in the real-world environment and could be either stationary or moving. The virtual camera could have an occluding object 208 lying in its field of view, as shown.

Next, sets of warped depth planes corresponding to two or more images from amongst the plurality of images are fused to form an output set of warped depth planes, and the output image is generated from the output set of warped depth planes. The output image represents a view from the viewpoint of the virtual camera 206. The view also represents those regions of the real-world environment which would have otherwise been occluded due to presence of the occluding object 208.

Figure 3A:
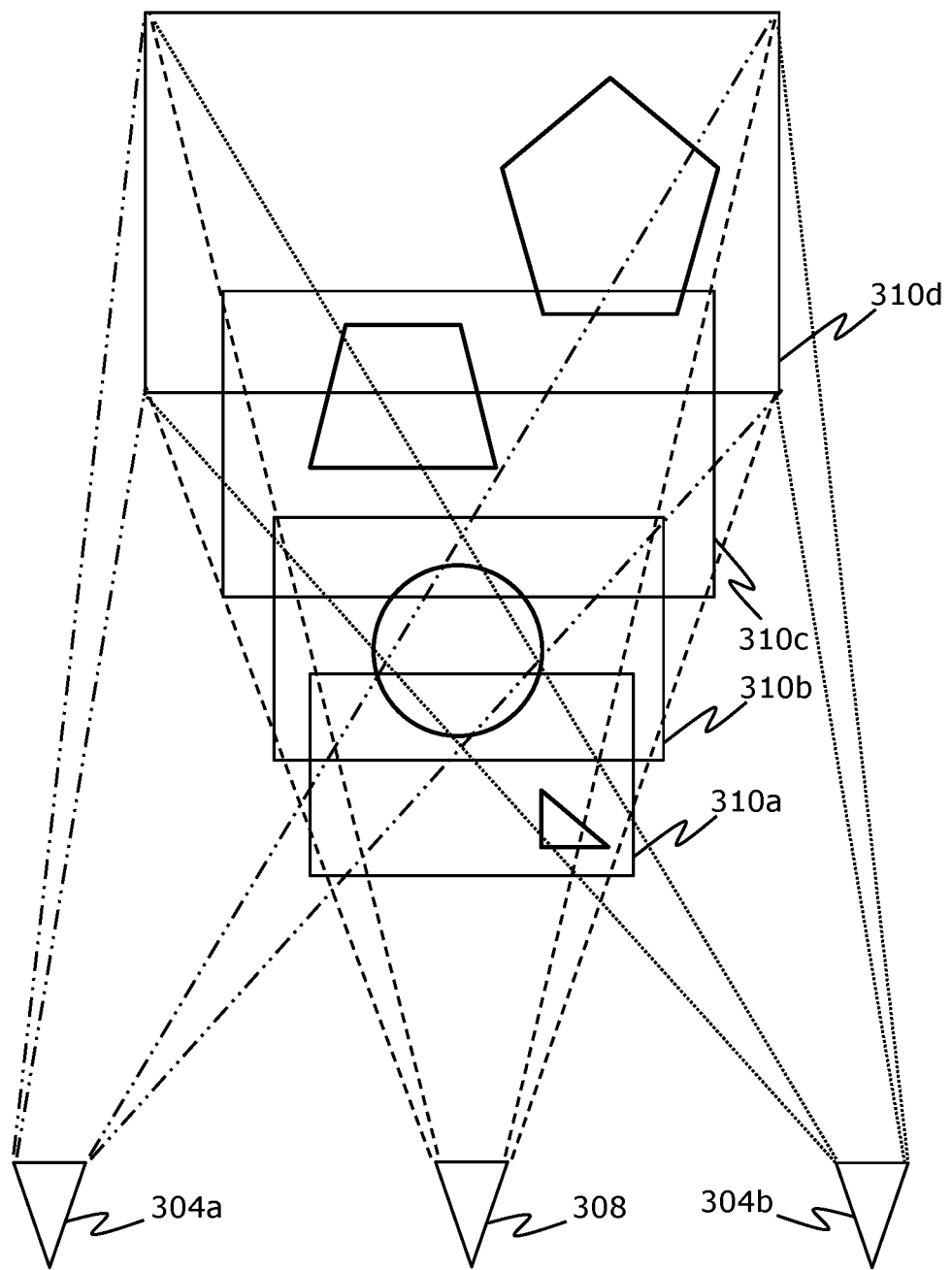
FIG. 3A illustrates an exemplary usage scenario of an imaging system.
Figure 3B:
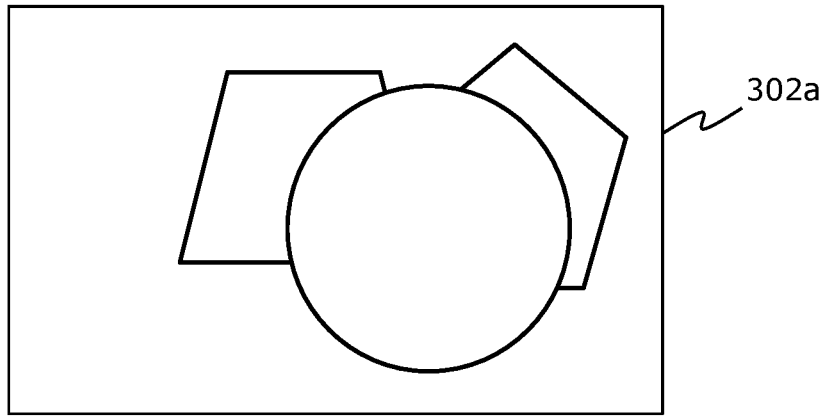
FIG. 3B illustrates a first image captured from a first known viewpoint.
Figure 3C:
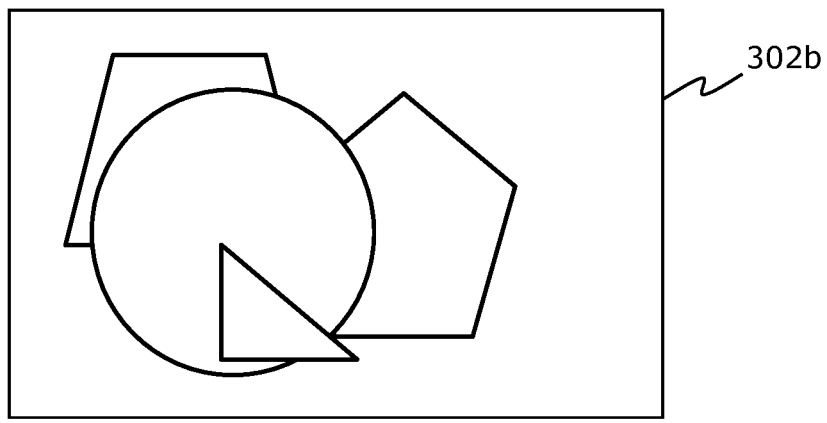
FIG. 3C illustrates a second image captured from a second known viewpoint.
Figure 3D:
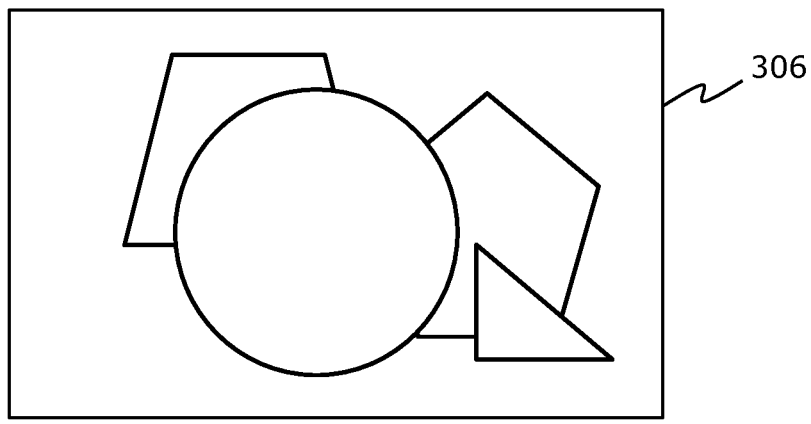
FIG. 3D illustrates an output image synthesized from a novel viewpoint, in accordance with an embodiment of the present disclosure.

Referring to FIGS. 3A-3D, FIG. 3A illustrates an exemplary usage scenario of an imaging system, FIG. 3B illustrates a first image 302a captured from a first known viewpoint 304a, FIG. 3C illustrates a second image 302b captured from a second known viewpoint 304b, and FIG. 3D illustrates an output image 306 synthesized from a novel viewpoint 308, in accordance with an embodiment of the present disclosure. In FIG. 3A, there is shown a schematic representation of a given region of a real-world environment. The real-world environment includes, for example, four different objects at different optical depths. For simplicity, the four different objects are shown as a pentagon, a trapezium, a circle, and a triangle. A plurality of images (for example, such as the first image 302a and the second image 302b) of a given region of the real-world environment are captured by a plurality of cameras (including, for example, a first camera (not shown) and a second camera (not shown)). A viewpoint of the first camera serves as the first known viewpoint 304a, whereas a viewpoint of the second camera serves as the second known viewpoint 304b. Next, there are received corresponding depth maps of the given region of the real-world environment with respect to the plurality of cameras. Then, there are identified different portions of each image that represent objects located at different optical depths with respect to a viewpoint of a given camera that captured said image. For each image amongst the plurality of images, there is created a set of depth planes (depicted as depth planes 310a, 310b, 310c, and 310d). The depth planes of each set are warped to match a perspective of a new viewpoint (namely, the novel viewpoint) 308 corresponding to which the output image is to be generated. An output set of warped depth planes is formed by fusing the sets of warped depth planes corresponding to two or more images from amongst the plurality of images. The output image 306 is generated from the output set of warped depth planes.

In FIG. 3B, the first image 302a has different portions that represent objects located at different optical depths with respect to the first viewpoint 304a of the first camera that captured the first image 302a. The first image 302a represents objects located at optical depths corresponding to the depth planes 310b-310d, from a perspective of the first viewpoint 304a. The object located at an optical depth corresponding to the depth plane 310a is not visible from the perspective of the first viewpoint 304a and is thus not represented in the first image 302a. In FIG. 3C, the second image 302b has different portions that represent objects located at different optical depths with respect to the second viewpoint 304b of the second camera that captured the second image 302b. The second image 302b represents objects located at optical depths corresponding to the depth planes 310a-310d, from a perspective of the second viewpoint 304b. In FIG. 3D, the output image 306 represents objects lying in the depth planes 310a-310d, from a perspective of the novel viewpoint 308.

FIGS. 2 and 3A-3D are merely examples, which should not unduly limit the scope of the claims herein. The person skilled in the art will recognize many variations, alternatives, and modifications of embodiments of the present disclosure.

Figure 4A:
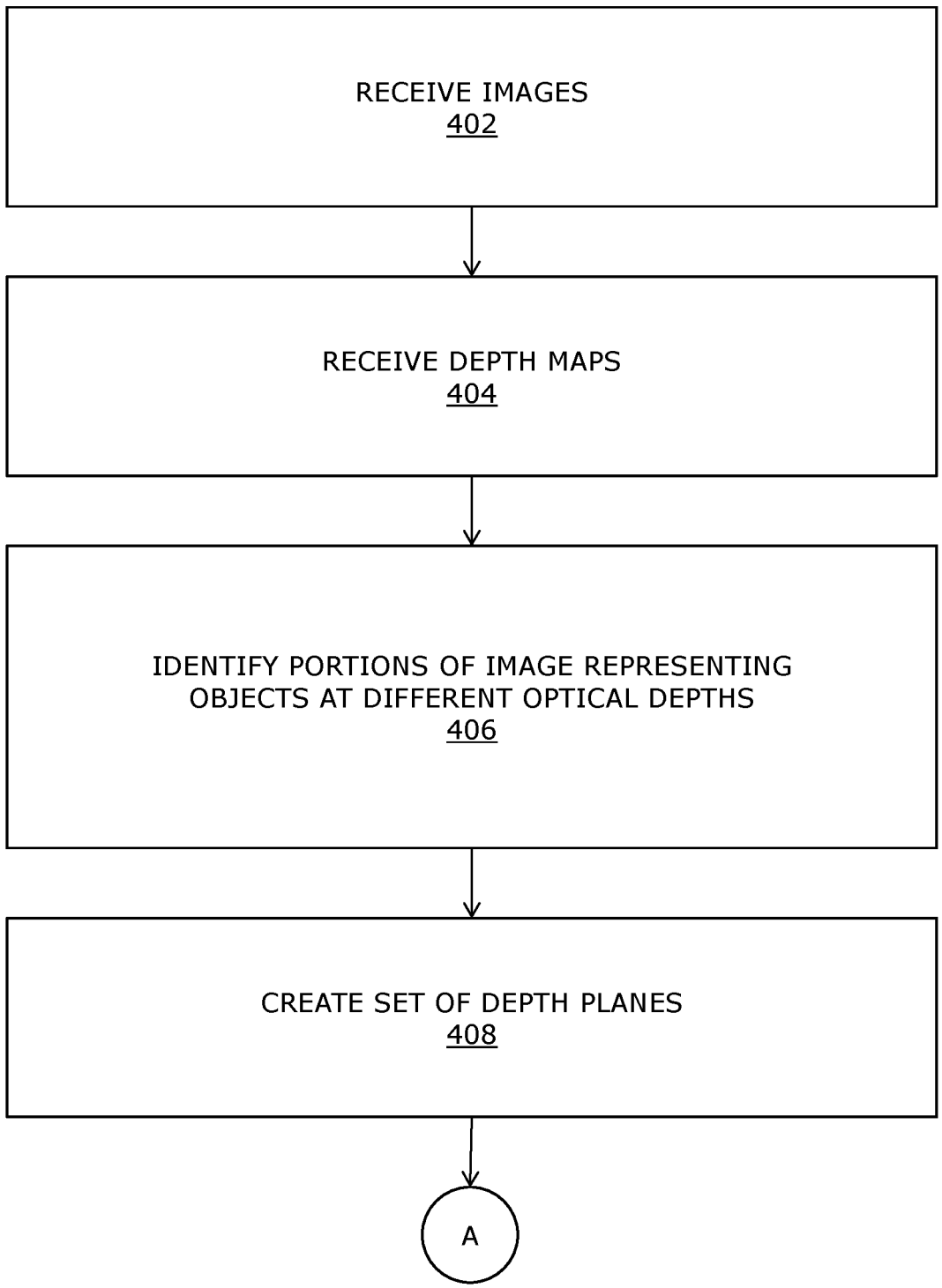
FIGS. 4A and 4B illustrate steps of a method incorporating high dynamic range viewpoint synthesis, in accordance with an embodiment of the present disclosure.
Figure 4B:
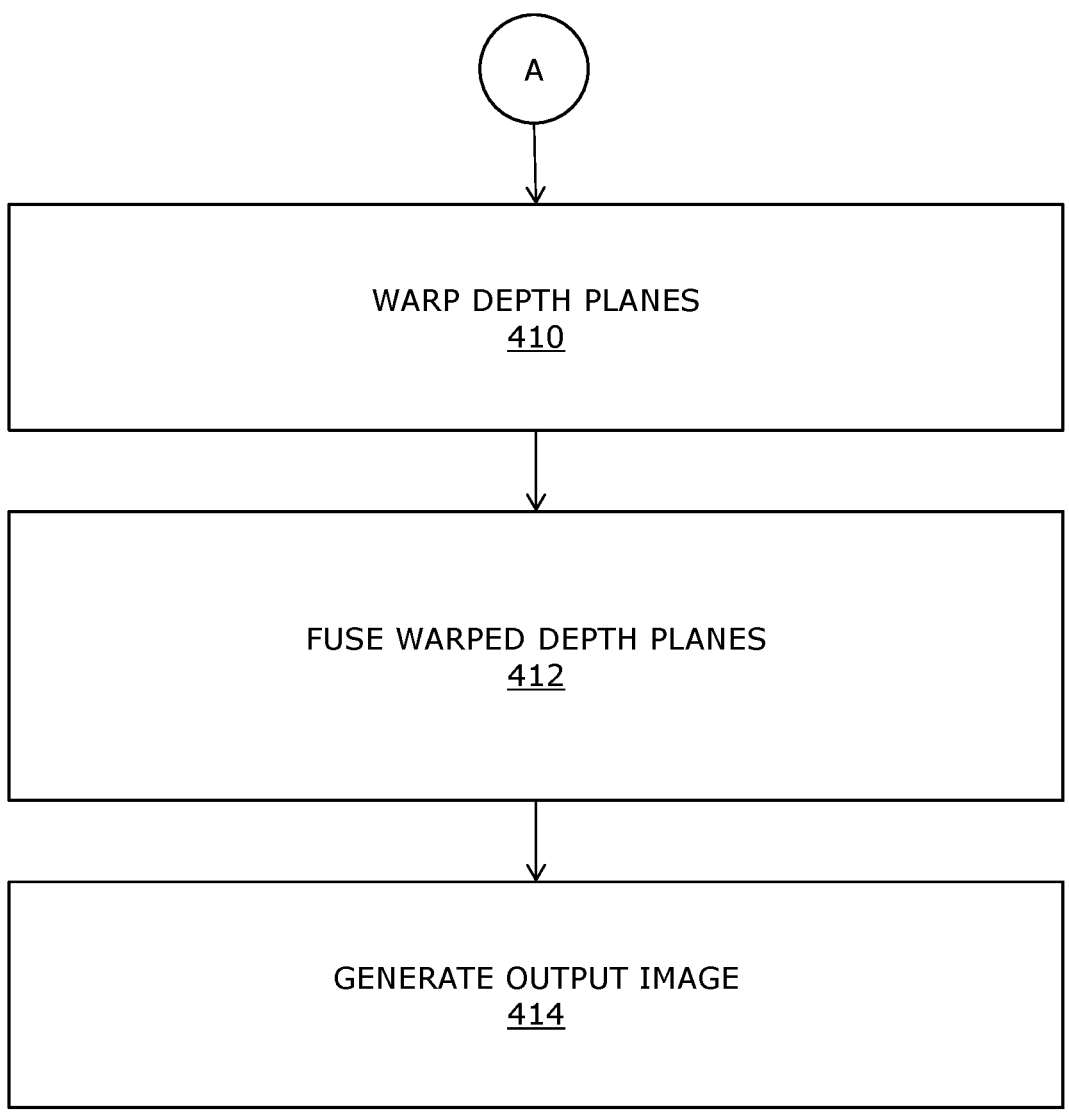

Referring to FIGS. 4A and 4B, illustrated are steps of a method incorporating high dynamic range viewpoint synthesis, in accordance with an embodiment of the present disclosure. At step 402, there are received a plurality of images of a given region of a real-world environment that are captured by a plurality of cameras. At least two images from amongst the plurality of images are captured using at least one of: different exposure times, different sensitivities, different apertures. At step 404, there are received corresponding depth maps of the given region of the real-world environment with respect to different viewpoints of the plurality of cameras. The corresponding depth maps are generated by depth-mapping means corresponding to each of the plurality of cameras. At step 406, there are identified different portions of each image that represent objects located at different optical depths with respect to a viewpoint of a given camera that captured said image. At step 408, a set of depth planes corresponding to each image are created, based on the different optical depths of the objects and relative positions of the different portions of said image representing the objects, wherein a given depth plane is representative of objects or parts of the objects that are located at a same optical depth or within a predefined depth from the same optical depth. At step 410, depth planes of each set are warped for matching a perspective of a new viewpoint corresponding to which an output image is to be generated. At step 412, sets of warped depth planes corresponding to two or more images from amongst the plurality of images are fused for forming an output set of warped depth planes. At step 414, the output image is generated from the output set of warped depth planes.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising at least one processor and a data repository communicably coupled to the at least one processor, wherein the at least one processor is configured to:

receive a plurality of images of a given region of a real-world environment that are captured by a plurality of cameras, wherein at least two images from amongst the plurality of images are captured using at least one of: different exposure times, different sensitivities, different apertures;

receive corresponding depth maps of the given region of the real-world environment with respect to different viewpoints of the plurality of cameras, wherein the corresponding depth maps are generated by depth-mapping means corresponding to each of the plurality of cameras;

identify different portions of each image that represent objects located at different optical depths with respect to a viewpoint of a given camera that captured said image;

create a set of depth planes corresponding to each image, based on the different optical depths of the objects and relative positions of the different portions of said image representing the objects, wherein a given depth plane is representative of objects or parts of the objects that are located at a same optical depth or within a predefined depth from the same optical depth;

warp depth planes of each set to match a perspective of a new viewpoint corresponding to which an output image is to be generated;

fuse sets of warped depth planes corresponding to two or more images from amongst the plurality of images to form an output set of warped depth planes; and generate the output image from the output set of warped depth planes.

2. The imaging system of claim 1, wherein when fusing the sets of warped depth planes, the at least one processor is configured to:

for a given warped depth plane of a given set, select a warped depth plane from amongst warped depth planes of another set whose optical depth is closest to an optical depth of the given warped depth plane; and fuse the given warped depth plane of the given set with the warped depth plane of the another set to generate a corresponding warped depth plane of the output set.

3. The imaging system of claim 1, wherein the at least one processor is configured to:

mark the set of depth planes corresponding to each image with information indicative of at least one of: an exposure time, a sensitivity, an aperture used to capture said image; and select the two or more images from amongst the plurality of images, based on said information.

4. The imaging system of claim 1, wherein the at least one processor is configured to:

compute weights for pixels of the two or more images whose corresponding sets of warped depth planes are to be fused; and fuse the sets of warped depth planes to form the output set of warped depth planes, based on the weights computed for the pixels.

5. The imaging system of claim 4, wherein the weights are computed based on at least one of: brightness, sensitivity, saturation, well-exposedness, contrast, saliency, of the pixels.

6. The imaging system of claim 4, wherein the weights are computed based on ranking of two or more cameras that captured respective ones of the two or more images.

7. The imaging system of claim 1, wherein the at least one processor is configured to:

rank the plurality of cameras, based on at least one of: a difference between a viewpoint of a given camera and the new viewpoint, whether there is an overlap between a focusing distance range of the given camera and a focusing distance range of a neural network that is to be employed for processing the output image, an extent of the overlap, an image resolution of the given camera, a focus plane of the given camera, noise characteristics of the given camera, colour characteristics of the given camera, how recent is an image captured by the given camera; and select two or more cameras from amongst the plurality of cameras that captured respective ones of the two or more images whose corresponding sets of warped depth planes are to be fused, based on the ranking of the plurality of cameras.

8. The imaging system of claim 1, wherein the at least one processor is configured to:

identify occluded pixels in each warped depth plane, based on colour values and alpha values of pixels of said warped depth plane;

remove the occluded pixels from each warped depth plane; and fuse the sets of warped depth planes to form the output set of warped depth planes, by utilising non-occluded pixels in the warped depth planes.

9. The imaging system of claim 1, wherein the at least one processor is configured to inpaint empty pixels in the output image.

10. A computer-implemented method comprising:

receiving a plurality of images of a given region of a real-world environment that are captured by a plurality of cameras, wherein at least two images from amongst the plurality of images are captured using at least one of: different exposure times, different sensitivities, different apertures;

receiving corresponding depth maps of the given region of the real-world environment with respect to different viewpoints of the plurality of cameras, wherein the corresponding depth maps are generated by depth-mapping means corresponding to each of the plurality of cameras;

identifying different portions of each image that represent objects located at different optical depths with respect to a viewpoint of a given camera that captured said image;

creating a set of depth planes corresponding to each image, based on the different optical depths of the objects and relative positions of the different portions of said image representing the objects, wherein a given depth plane is representative of objects or parts of the objects that are located at a same optical depth or within a predefined depth from the same optical depth;

warping depth planes of each set for matching a perspective of a new viewpoint corresponding to which an output image is to be generated;

fusing sets of warped depth planes corresponding to two or more images from amongst the plurality of images for forming an output set of warped depth planes; and generating the output image from the output set of warped depth planes.

11. The method of claim 10, wherein the step of fusing the sets of warped depth planes comprises:

for a given warped depth plane of a given set, selecting a warped depth plane from amongst warped depth planes of another set whose optical depth is closest to an optical depth of the given warped depth plane; and fusing the given warped depth plane of the given set with the warped depth plane of the another set for generating a corresponding warped depth plane of the output set.

12. The method of claim 10, further comprising:
marking the set of depth planes corresponding to each image with information indicative of at least one of: an exposure time, a sensitivity, an aperture used to capture said image; and
selecting the two or more images from amongst the plurality of images, based on said information.

13. The method of claim 10, further comprising:
computing weights for pixels of the two or more images whose corresponding sets of warped depth planes are to be fused; and
fusing the sets of warped depth planes for forming the output set of warped depth planes, based on the weights computed for the pixels.

14. The method of claim 13, wherein the weights are computed based on at least one of: brightness, sensitivity, saturation, well-exposedness, contrast, saliency, of the pixels.

15. The method of claim 13, wherein the weights are computed based on ranking of two or more cameras that captured respective ones of the two or more images.

16. The method of claim 10, further comprising:
ranking the plurality of cameras, based on at least one of: a difference between a viewpoint of a given camera and the new viewpoint, whether there is an overlap between a focusing distance range of the given camera and a focusing distance range of a neural network that is to be employed for processing the output image, an extent of the overlap, an image resolution of the given camera, a focus plane of the given camera, noise characteristics of the given camera, colour characteristics of the given camera, how recent is an image captured by the given camera; and
selecting two or more cameras from amongst the plurality of cameras that captured respective ones of the two or more images whose corresponding sets of warped depth planes are to be fused, based on the ranking of the plurality of cameras.

17. The method of claim 10, further comprising:
identifying occluded pixels in each warped depth plane, based on colour values and alpha values of pixels of said warped depth plane;
removing the occluded pixels from each warped depth plane; and
fusing the sets of warped depth planes for forming the output set of warped depth planes, by utilising non-occluded pixels in the warped depth planes.

18. The method of claim 10, further comprising inpainting empty pixels in the output image.

* * * * *